Feb. 9, 1926.
C. BJORKLUND
1,572,464
INTAKE CONNECTING BOLT
Filed Nov. 1, 1924
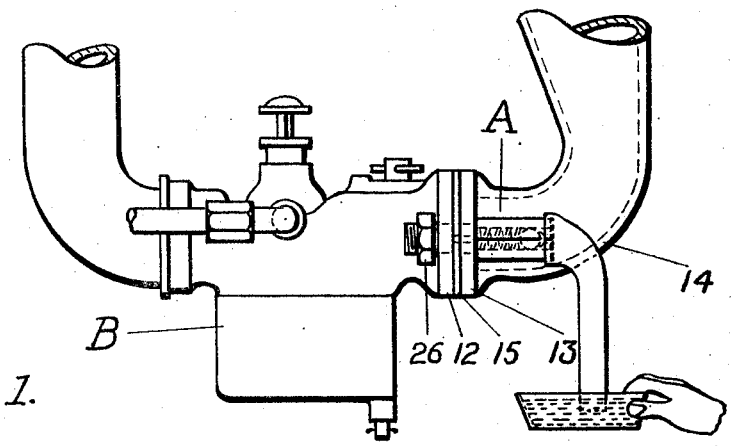
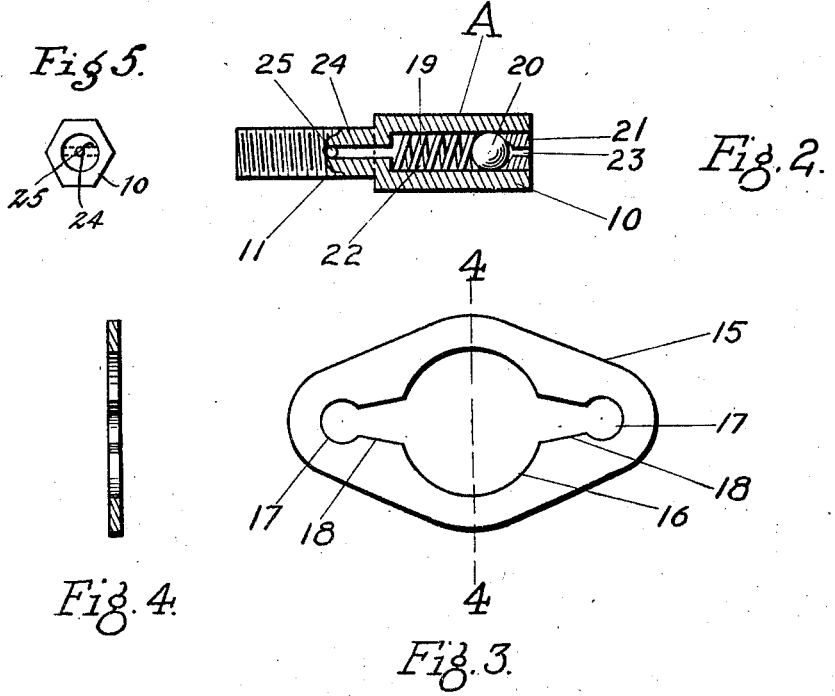
INVENTOR
Charles Bjorklund
BY
ATTORNEY Patented Feb. 9, 1926.

1,572,464

UNITED STATES PATENT OFFICE.

CHARLES BJORKLUND, OF ST. PAUL, MINNESOTA.

INTAKE-CONNECTING BOLT.

Application filed November 1, 1924. Serial No. 747,262.

*To all whom it may concern:*

Be it known that I, CHARLES BJORKLUND, a citizen of the United States, residing at St. Paul, in the county of Ramsey and State of Minnesota, have invented a new and useful Improvement in Intake-Connecting Bolts, of which the following is a specification.

My invention relates to intake connecting bolts wherein I have provided a bolt for connecting carburetors to the intake pipe of an internal combustion engine, together with gasket means interposed between the carburetor and intake pipe coacting with the intake bolt to form an auxiliary air inlet into the intake pipe.

The invention includes a connecting bolt of a very simple, inexpensive construction, having a passageway formed therein, together with a chamber for supporting a valve to provide means for carrying out my invention.

A feature of the invention includes a connecting bolt for carburetors and intake pipes wherein the bolt is of a suitable construction to permit it to be substituted for present connecting bolts. The bolt is formed with an enlarged head and the ordinary threaded shank so that it can be used and substituted for the ordinary connecting bolts now used for the connection of carburetors and intake pipes.

It is also a feature of my invention to provide a gasket having a peculiar formation, whereby the same is adapted to cooperate with my intake bolts in a manner to admit fresh air into the intake pipe in the operation of an internal combustion engine.

In the drawings forming part of my specification,

Figure 1 is a diagrammatic view of a carburetor showing my connecting bolt and the use thereof in relation to an intake pipe of an internal combustion engine, only a portion of the intake pipe being illustrated.

Figure 2 is a central cross section through a portion of my connecting bolt.

Figure 3 illustrates my gasket used in conjunction with my bolt.

Figure 4 is a section on the line 4—4 of Figure 3.

Figure 5 is an end view of my connecting bolt.

In the drawings my connecting bolt A is formed with a hexagonal head portion 10 from which projects the threaded shank 11 which is adapted to extend through the flange 12 of the carburetor B and the flange 13 of the intake pipe 14, only a portion of the intake pipe being illustrated in the drawings, which connects with an internal combustion engine, not illustrated in the drawings.

In using my bolt A to connect the flanges 12 and 13 it is desirable to use the gasket 15 to form a tight joint between the flanges so that the air suction from the internal combustion engine will be through the carburetor B.

The gasket 15 is formed with an outer shape to similate the shape of the flanges 12 and 13, while the center is cut away to form the circular opening 16 and is provided with openings 17 through which the shank 11 of the bolt A is adapted to extend. Connecting with the openings 17 I form passageways 18, so as to connect the openings 17 and 16.

My connecting bolt A is formed with a chamber 19 within the head portion 10 in which a ball valve 20 is positioned and is adapted to be held against the valve seat formed in the plug 21, which is positioned within the outer end of the chamber 19. A coil spring 22 is adapted to hold the ball 20 in contact with the seat of the plug 21 to close the passageway 23 formed in the plug 21 when the connecting bolt A is inoperative by reason of the fact that the internal combustion engine is not operating. Communicating with the chamber 19 and extending into the shank 11 of the bolt A is an axial passageway 24. This passageway 24 is adapted to connect with a transversely extending passageway 25 which extends transversely through the shank 11.

In use, the bolt A is connected with the flanges and extends through the same of the intake pipe 14 and the carburetor B, while the gasket 15 is interposed between the flanges 12 and 13 and by an ordinary nut 26 the bolt A is adapted to draw the flanges 12 and 13 tightly against the gasket 15. Two of the bolts A hold the flanges 12 and 13 together. It is obvious that as many bolts as may be desired can be used, provided the flanges 12 and 13 are formed with the necessary bolt receiving openings, so that any number can be used to connect the flanges together, and the gasket 15 can be formed with as many openings such as 18 from the bolt openings 17 connecting with the central opening 16 as corresponds to the number of bolts A used. When in connecting position the bolts A permit air to be introduced through the same from the opening 23 through the chamber 19, passageway 24 and transverse passageway 25, through the openings 18 and into the manifold 14. Thus, when the carburetor B is connected to an internal combustion engine by an intake pipe 14 by my connecting bolts A, the valves 20 will operate in accordance with the suction and operation of the internal combustion engine to admit fresh air into the intake pipe 14, reducing the vacuum on the carburetor B to reduce the amount of gas used by the internal combustion engine and to permit the same to operate more efficiently under certain conditions and thereby provide a material saving in the use of gasoline or fuel by the internal combustion engine.

Because the extremely simple, inexpensive construction of my connecting bolts A and by reason of the fact that it is necessary to use some kind of a connecting bolt to connect the carburetor B and the intake pipe 14 on any internal combustion engine, it is obvious that my connecting bolt may be adopted and used in place of the ordinary connecting bolt with more effect and in a manner to provide auxiliary air valves in connection with the intake manifold. The use of my invention is not expensive as it is only necessary to replace the ordinary connecting bolts and the ordinary gasket in any automobile with my connecting bolt A and gasket 15. Such replacement forms a very practical and desirable connection for internal combustion engines, as I have found by actual tests of my invention upon present makes of automobiles of a well known type.

I have proven without question the saving of fuel and the more efficient operation of the automobile by the use of my connecting bolts. It will be readily comprehended that the design and construction of my connecting bolts, together with the gasket provides a means assisting in the carburetion of the fuel by directing cross currents of air into the intake connecting means, which assists in breaking up and completely vaporizing the fuel from the carburetor.

Tests which I have made with my connecting bolts A have shown that they have a wonderful effect upon the mixture of the fuel. It is to be noted that, by frictionally connecting a pipe as is illustrated in Figure 1 to the end of my valve A and immersing this pipe in a pan of water, sufficient moisture will be drawn into the intake pipe of the internal combustion engine in the operation of the same to soften the carbon formation therein, and I have found that if periodical applications of the moisture are made in this manner to the internal combustion engine little or no carbon trouble is experienced, a feature which is quite desirable in the operation of automobile engines.

The opening through my connecting bolt A is small and thus only a small amount of moisture is admitted and this is preferably done when the motor is well heated, so that the moisture can be vaporized easily upon its introduction into the intake and motor. It is to be considered that the inexpensive construction and practical nature of my invention is of such merit as to permit the most general use of my connecting bolt in place of the ordinary bolts for connecting carburetors with intake pipes of internal combustion engines.

In accordance with the patent statues I have described the principles of operation of my connecting bolt A and while the construction is extremely simple, yet I desire to have it understood that the drawings are only illustrative and that the invention can be carried out and applied to uses other than those above set forth within the scope of the following claims.

I claim:

1. A carburetor intake connecting bolt, including a valve and passageway therethrough adapted to admit air into the intake pipe between the carburetor and the internal combustion engine.

2. A connecting bolt for carburetors and intake pipes including valve means within said bolt, a passageway extending longitudinally and transversely through the same and gasket means adapted to coact with said connecting bolt to admit air between the carburetor and the intake from the outer atmosphere into the intake of an internal combustion engine.

3. A connecting bolt for carburetor and intake flanges including an air passageway through said bolt and a valve for closing said air passageway.

4. A carburetor and intake connecting bolt comprising a passageway formed in said bolt, a valve for closing said passageway and a transverse passageway connecting with the first named passageway formed in said bolt to direct air from the outer atmosphere into the carburetor and intake passageway in the operation of the same.

5. A connecting bolt for automobiles including an opening formed in said bolt, a valve for closing said opening, means for holding said valve in normally closed position and an opening extending into said bolt adapted to connect the first named opening therein with the intake passageway of the automobile in a manner so that when the automobile is in operation air can be fed from the outer atmosphere into the motor of the automobile through said bolt.

6. A carburetor intake connecting bolt including a passageway and valve in said bolt adapted to permit air to be fed through said bolt.

7. A connecting bolt for internal combustion engines including a passageway through said bolt, valve means in said passageway to permit air to be fed through said bolt by the operation of the internal combustion engine.

8. A connection for internal combustion engines including a bolt adapted to connect the flanges of the carburetor and intake pipe thereof, a gasket interposed between the carburetor and intake flanges, means formed in said bolt adapted to permit air to be fed through the same by the operation of the internal combustion engine, and means in said bolt for automatically closing the passageway formed therein.

CHARLES BJORKLUND.